(12) United States Patent
Shima et al.

(10) Patent No.: US 7,996,405 B2
(45) Date of Patent: Aug. 9, 2011

(54) TECHNIQUE FOR MANAGING DATA IN ASSOCIATION WITH TAG INFORMATION

(75) Inventors: Kataro Shima, Tokyo (JP); Kenji Uchida, Haryana (IN); Maaki Wakao, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 395 days.

(21) Appl. No.: 12/049,502

(22) Filed: Mar. 17, 2008

(65) Prior Publication Data
US 2008/0235194 A1 Sep. 25, 2008

(30) Foreign Application Priority Data
Mar. 20, 2007 (JP) .................. 2007-072819

(51) Int. Cl.
*G06F 7/02* (2006.01)
*G06F 17/30* (2006.01)
(52) U.S. Cl. ........ 707/738; 707/740; 707/748; 707/758; 707/723
(58) Field of Classification Search ....... 707/3, 999.003, 707/758, 711, 715, 100, 102, 999.1, 999.102, 707/738, 740, 748
See application file for complete search history.

(56) References Cited

U.S. PATENT DOCUMENTS

| 2007/0006067 A1* | 1/2007 | Kikuchi | 715/501.1 |
| 2008/0071751 A1* | 3/2008 | Keith, Jr. | 707/3 |
| 2008/0228734 A1* | 9/2008 | Kang | 707/3 |

FOREIGN PATENT DOCUMENTS

| JP | 08-287086 | 11/1996 |
| JP | 09-198395 | 7/1997 |
| JP | 2003-06225 | 1/2003 |
| JP | 2006-092251 | 4/2006 |

OTHER PUBLICATIONS

"Extraction of Tag Candidates", url: http://tdiary.ishinao.net/20051201.html#p02. Dec. 1, 2005.
"About TagClick", url: http://ww.tagclick.net/overview/.
Jyunichi, Akahani et al. "Ideas Regarding the Direction of the Semantic Web and Conversion of Approximation Ontology", NTT Technical Journal, vol. 15, Issue 3, Mar. 1, 2003, NTT Communications Science Laboratories, Tokyo, Japan.

(Continued)

*Primary Examiner* — James Trujillo
*Assistant Examiner* — Bruce M Moser
(74) *Attorney, Agent, or Firm* — Jordan IP Law, PC

(57) ABSTRACT

To enhance the convenience of a bookmark function for web pages, a system for displaying identification information enables a user to select a file. Included is a storage section that stores identification information of each of classified files in association with tag information indicating classification of contents of that file, a search section that, in response to inputting of tag information to be registered, searches the classified files for a file including information matching with the input tag information, a first storing section that stores the input tag information in the storage section in association with identification information of the searched file, and a display section that, in response to a display request for identification information designating tag information, reads identification information associated with the designated tag information from the storage section, and displays the read identification information.

10 Claims, 15 Drawing Sheets

OTHER PUBLICATIONS del.icio.us/help/tags, Social Bookmarking. url: http://del.icio.us, pp. 1-2, Mar. 11, 2008.

Nifty clip β| blog of staff, Jul. 13, 2006, [search performed on Jun. 11, 2009], <URL:http://web.archive.org/web/20060714142901/http://clip.staff.coocaan.jp/blog/>.

Help | Nifty clip, 2006, How to read the screen, [search performed on Jun. 10, 2009], <http://web.archive.org/web/20060712015828/http://clip.nifty.com/help/>.

Help | Nifty clip, 2006, Operating Method, [search performed on Jun. 10, 2009], <http://web.archieve.org/web/20060706184700/http://clip.nifty.com/help/help_sousa.html>.

* cited by examiner

```
                    ┌─START─┐
                        │
          ┌─────────────▼──────────────┐
          │  RECEIVE DISPLAY REQUEST   │──S1100
          └─────────────┬──────────────┘
                        │
          ┌─────────────▼──────────────┐
          │     READ CORRESPONDING     │──S1110
          │   IDENTIFICATION INFORMATION│
          └─────────────┬──────────────┘
                        │
          ┌─────────────▼──────────────┐
          │ DETERMINE DISPLAY ORDER FOR │
          │  IDENTIFICATION INFORMATION │──S1120
          │ CORRESPONDING TO MANUAL TAG │
          └─────────────┬──────────────┘
                        │
          ┌─────────────▼──────────────┐
          │ DETERMINE DISPLAY ORDER FOR │
          │  IDENTIFICATION INFORMATION │──S1130
          │CORRESPONDING TO AUTOMATIC TAG│
          └─────────────┬──────────────┘
                        │
          ┌─────────────▼──────────────┐
          │      INSTRUCT DISPLAY      │──S1140
          └─────────────┬──────────────┘
                     ┌──▼──┐
                     │ END │
                     └─────┘
```

FIG. 11

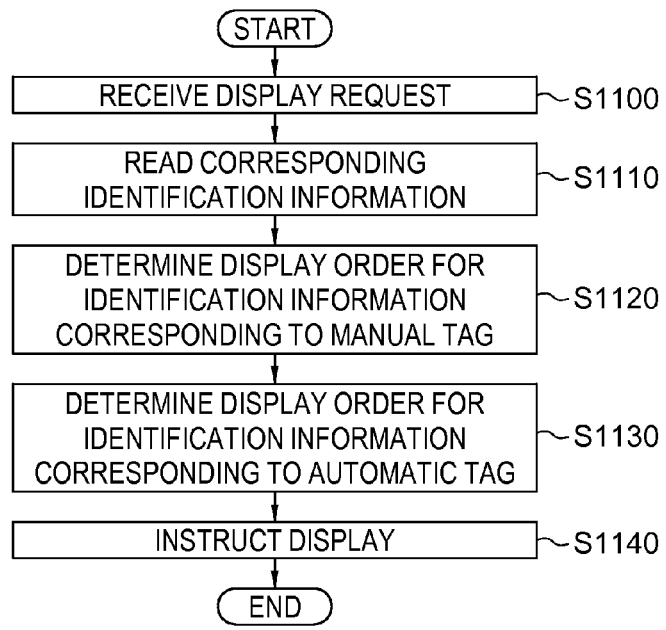

| RESULT TYPE | IDENTIFICATION | OTHER TAG INFORMATION | | |
|---|---|---|---|---|
| | | javascript | map | web |
| MANUAL | Google maps | ○ | ○ | ○ |
| | dojotoolkit.org | ○ | ○ | ○ |
| | Ajax-Wikipedia | ○ | ○ | × |
| | Adaptive Path | ○ | × | ○ |
| AUTOMATIC | Ajaxian | ○ | × | ○ |
| | What is Web 2.0 | × | ○ | ○ |
| | Programmable Web | × | × | ○ |
| | Town of Ajax, Canada | × | ○ | × |

FIG. 12

|  | KEYWORD IN FILE? | KEYWORD SET AS TAG INFORMATION? |
|---|---|---|
| CASE 1 | ○ | ○ |
| CASE 2 | ○ | × |

FIG. 13A

| | | MANUAL | FIRST EXAMPLE | SECOND EXAMPLE | THIRD EXAMPLE |
|---|---|---|---|---|---|
| EASINESS OF SELECTION OF IDENTIFICATION INFORMATION | CASE 1 | ○ | △ | △ | ○ |
| | CASE 2 | × | △ | △ | ○ |
| EASINESS OF SEARCH FOR TAG INFORMATION | | ○ | × | ○ | ○ |
| EXHAUSITIVITY OF REGISTRATION | | × | △ | △ | ○ |

| IDENTIFICATION INFORMATION | USER INFORMATION | TAG INFORMATION |
|---|---|---|
| www.△△△.com | A | XXX |
| | B | YYY |
| | A | ZZZ |
| | ⋮ | ⋮ |
| www.☐☐☐.com | B | XXX |
| | C | ZZZ |
| | ⋮ | ⋮ |
| ⋮ | ⋮ | |

TECHNIQUE FOR MANAGING DATA IN ASSOCIATION WITH TAG INFORMATION

FIELD OF THE INVENTION

The present invention relates to a technique for classifying and managing data. Particularly, the present invention relates to a technique for managing data in association with tag information.

BACKGROUND

Recently, web pages and web logs have been provided with a bookmark function. See, for example, "del.icio.us social bookmarking" (http://del.icio.us/), "About extraction of tag candidates" (http://tdiary.ishinao.net/20051201.html#p02), and "About TagClick" (http://www.tagclick.net/overview/). Bookmarking is to preregister URLs (Uniform Resource Locators) of web pages which are frequently viewed, and display a list thereof in a selectable manner in response to a user request. When a user selects a desired URL from the list, this function can instantaneously display the associated web page without requiring the user's inputting the URL.

There is a case where when the number of registered URLs becomes enormously large, it is difficult to search the URLs for a URL of a desired web page. Conventionally, web pages are managed in association with their tag information. Tag information is a keyword or the like to be associated with a URL. A user classifies individual web pages based on the contents thereof, and registers the web pages in association with tag information indicating the contents. As tag information is designated at the time of searching for a web page, only those URLs which are associated with the tag information are displayed, thus making it easier to search for a desired URL.

When one forgets to add tag information or when there are too many URLs to be associated with a single piece of tag information, however, it is difficult to search for a desired URL even using tag information as exemplified in the following scenarios.

Forget to Add Tag Information:

1. A Portal tag is often associated with a bookmark relating to a Portal site. However, there may be a case where a user forgets to associate a bookmark with a Portal tag or a case where the user who is in a hurry temporarily puts a bookmark and associates the bookmark with tag information later.

2. The user wants to search for a URL should have been registered before (e.g., about XXX Portal V6 Information Center).

3. Even with a Portal tag designated, the user cannot search for the associated URL.

4. The user inevitably searches titles or abstract texts, which are additional information of a bookmark, with Portal used as a keyword.

5. The user found out a desired URL, but found no Portal tag associated therewith.

6. The user associated a Portal tag with the URL for next and later searching. Although there were other URLs with which the user also forgot to associate Portal tags, those URLs were not relevant to the current search and were thus left as they were.

7. Return to "2".

Embedding of Important URL:

1. An Ajax tag is often associated with a URL of a web page relating to Ajax.

2. While there are many URLs associated with Ajax tags, some of the URLs may not be referred to so much. Even if an Ajax tag is designated, therefore, a desired URL is not nec-essarily displayed near the top, and may be displayed far back from the top, thus making it difficult to search for the URL.

3. To narrow URLs to be searched, the URLs are searched with an Ajax tag in combination with another tag information. To narrow URLs to a searchable level, it may be necessary to combine two or three pieces of tag information.

4. To efficiently make next and later searching, tag information "Important" indicating a frequently-used URL can be associated with the searched URLs. However, repeating the process increases the number of URLs having "Important" added thereto.

5. Designating an "Important" tag alone is insufficient to narrow URLs, which requires a combination with another tag information.

As apparent from the above, depending on how tag information is used, a desired URL may not appear in the search results, or too many URLs, if registered, may lead to a large amount of search results, thus disabling to search for a desired URL.

SUMMARY

Accordingly, it is an object of the present invention to provide a system, method and program which can overcome the foregoing problems. The object is achieved by combinations of the features described in independent claims in the appended claims. Dependent claims define further advantageous specific examples of the present invention.

To overcome the problems, according to a first aspect of the present invention, there is provided a system for displaying identification information to allow a user to select a file, which includes a storage section that stores identification information of each of classified files in association with tag information indicating classification of contents of that file, a search section that, in response to inputting of tag information to be registered, searches the classified files for a file including information matching with the input tag information, a first storing section that stores the input tag information in the storage section in association with identification information of the searched file, and a display section that, in response to a display request for identification information designating tag information, reads identification information associated with the designated tag information from the storage section, and displays the read identification information. According to further aspects of the present invention, there are provided a method which displays identification information using the system, and a program which causes a computer to function as the system.

The above summary of the present invention does not recite all the necessary features of the invention, and sub-combinations of those features may also encompass the invention.

BRIEF DESCRIPTION OF THE DRAWINGS

FIG. 11 is a flowchart illustrating a flow of a process which the management device 30 executes according to a display request input.

FIG. 12 is a diagram showing a specific example of plural pieces of tag information associated with identification information of files.

FIG. 13 is a diagram showing features of various process examples.

FIG. 15 a diagram showing one example of a data structure in the storage section 300 according to the first modification of the embodiment.

DETAILED DESCRIPTION

The present invention will be described below by way of embodiments. However, the embodiment described below do not limit the scope of the invention claimed in the appended claims, and all the combinations of the features of the embodiments to be described should not necessarily be essential to the solving means of the invention.

Figure 1:
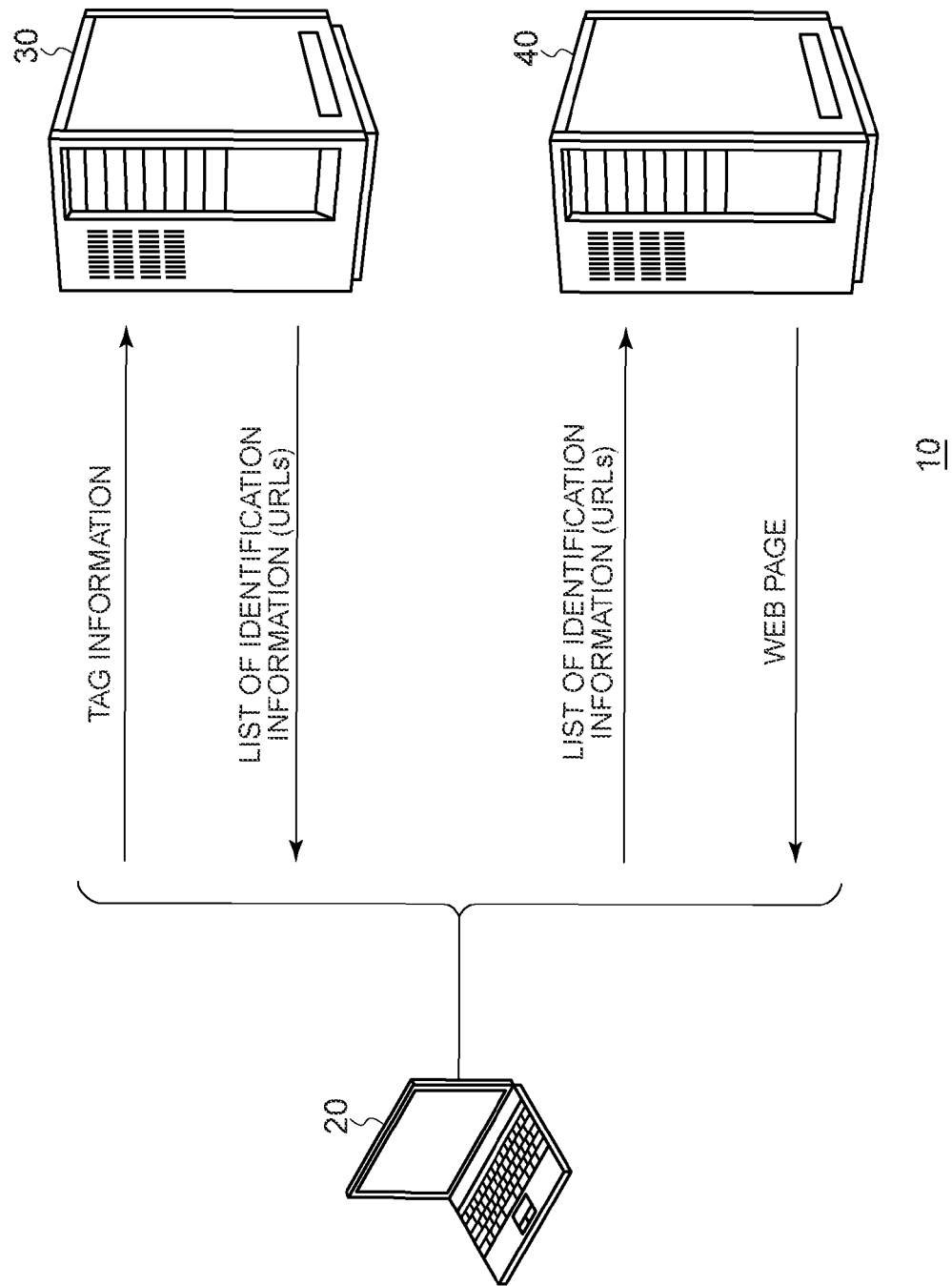
FIG. 1 is a diagram showing a general configuration of an information system 10 according to the embodiment.

FIG. 1 shows a general configuration of an information system 10 according to the embodiment. The information system 10 includes a terminal device 20, a management device 30 and a web server 40. The terminal device 20 is connected to the management device 30 and the web server 40 over a communication network such as the Internet. The management device 30 provides a so-called bookmark function. Specifically, the management device 30 registers therein identification information of files which are provided over the communication network, such as web pages, web logs, sounds, music pieces, still images and moving images, to ensure fast access to the files. Identification information is an URL (Uniform Resource Locator) or the like if a file is a web page.

To make it easier for a user to select a desired identification information from among plural pieces of identification information, the management device 30 stores the identification information in association with tag information classified according to the contents of files to be identified by the identification information. When receiving a display request for identification information designating tag information from the terminal device 20, the management device 30 returns a list of identification information corresponding to the tag information. The terminal device 20 displays the list of identification information to allow the user to select desired identification information. The selection is achieved by clicking of a pointing device. The identification information has a hyper link, so that the clicking action sends an HTTP request with an URL to the web server 40. Upon reception of the HTTP request, the web server 40 returns a file identified by the URL, such as a web page, to the terminal device 20.

The information system 10 according to the embodiment is designed to improve the convenience of such bookmarking, particularly, to make it easier to find out a desired bookmark from many bookmarks registered.

Figure 2:
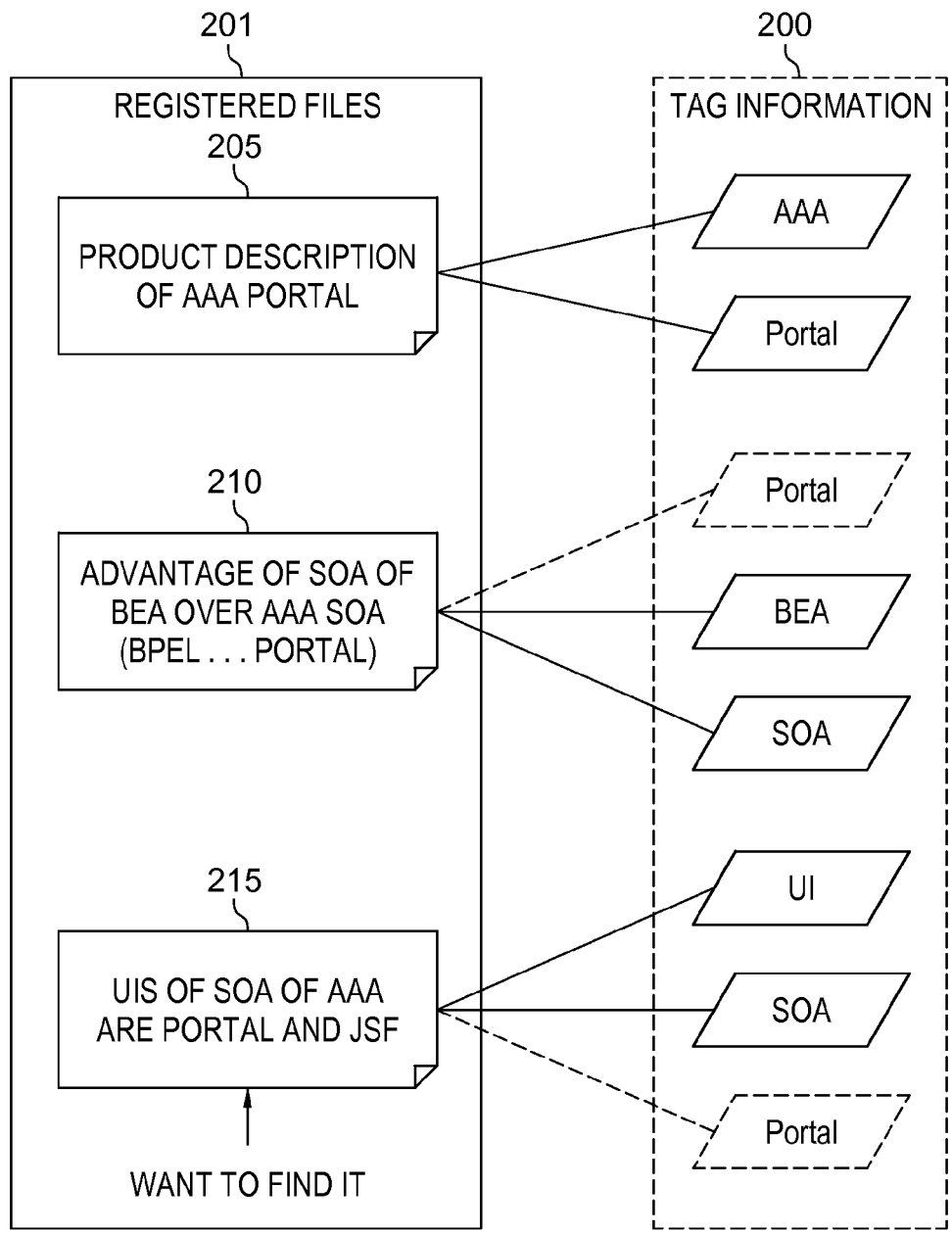
FIG. 2 is a diagram showing a first example of tag information associated with identification information of files.

FIG. 2 shows a first example of tag information 200 associated with identification information of files 201. The management device 30 has identification information of three files registered already. A first file 205 contains a character string "product description of AAA Portal". If the file is a web page, the character string may be included in the text of the web page or included in a title. Likewise, a second file 210 contains a character string "advantage of SOA of BEA over AAA SOA (BPEL ... Portal)". A third file 215 contains a character string "UIs of SOA of AAA are Portal and JSF". The substances of those files are stored in the web server 40. The web server 40 has only to store those files in such a way that the files can be accessed file by file, and specific storage formats of the individual files are not in question. For example, a file may be combined with another file and may be stored in the web server 40 as single binary data.

The management device 30 stores a character string "AAA" and a character string "Portal" as tag information associated with the identification information of the first file. In this way, plural pieces of tag information may be associated with a single file, and various viewpoints may be taken for classification of the contents of each file as long as the information indicates the classification. As shown in FIG. 2, tag information "BEA" and tag information "SOA" are associated with the identification information of the second file, while tag information "UI" and tag information "SOA" are associated with the identification information of the third file.

Upon reception of a display request for identification information designating "Portal" as tag information, the management device 30 selects identification information associated with "Portal" and returns it to the terminal device 20. In the example of FIG. 2, the first file is returned to the terminal device 20. Because the second file and the third file contain a character string "Portal", which is not associated with tag information "Portal", those files will not be returned to the terminal device 20. As a result, the user cannot find the third file the user wanted to find out. Apparently, if tag information is not registered adequately, it may be difficult to search for a file.

Figure 3:
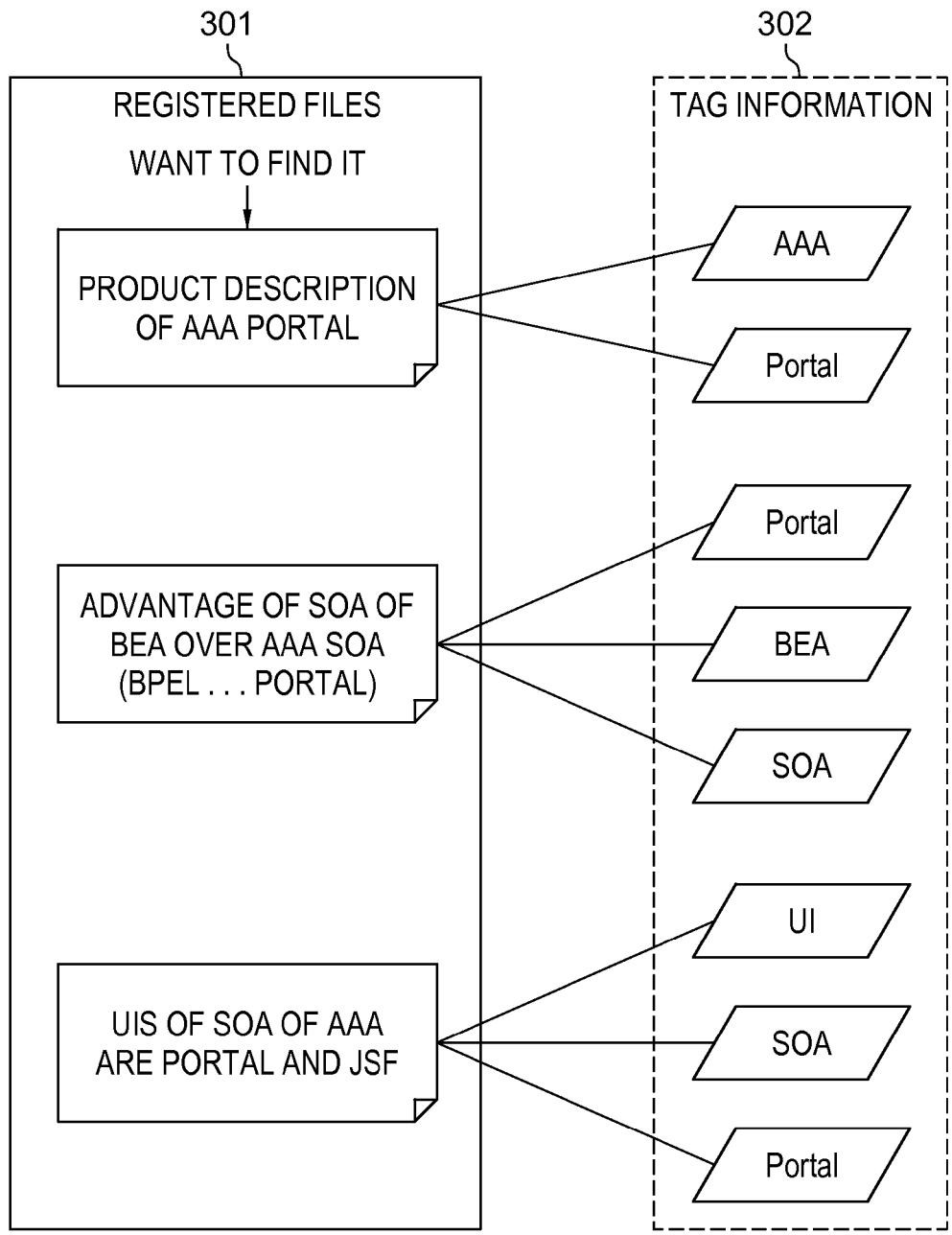
FIG. 3 is a diagram showing a second example of tag information associated with identification information of files.

FIG. 3 shows a second example of tag information 300 associated with identification information of files 301. The registered files are the same as those of the first example shown in FIG. 2. In the second example, however, tag information "Portal" is associated with the identification information of both the second file and the third file somehow. Upon reception of a display request for identification information designating "Portal" as tag information, therefore, the management device 30 selects identification information of each of the first to third files and returns it to the terminal device 20. The user can find the identification information of a desired file from the returned pieces of identification information.

It is the first file that the user wants to find in the second example. Therefore, designating "Portal" enables to find the first file exclusively in the first example, whereas in the second example, the second and third files are also displayed, so that the user should find a desired file from the displayed files. When the number of registered files is not three as in this example but is greater, it is not easy to find a desired file. That is, if certain tag information is associated with too many pieces of identification information, there are a lot of identification information to be displayed even with the tag information designated, thus making it difficult to search for a desired file.

Figure 4:
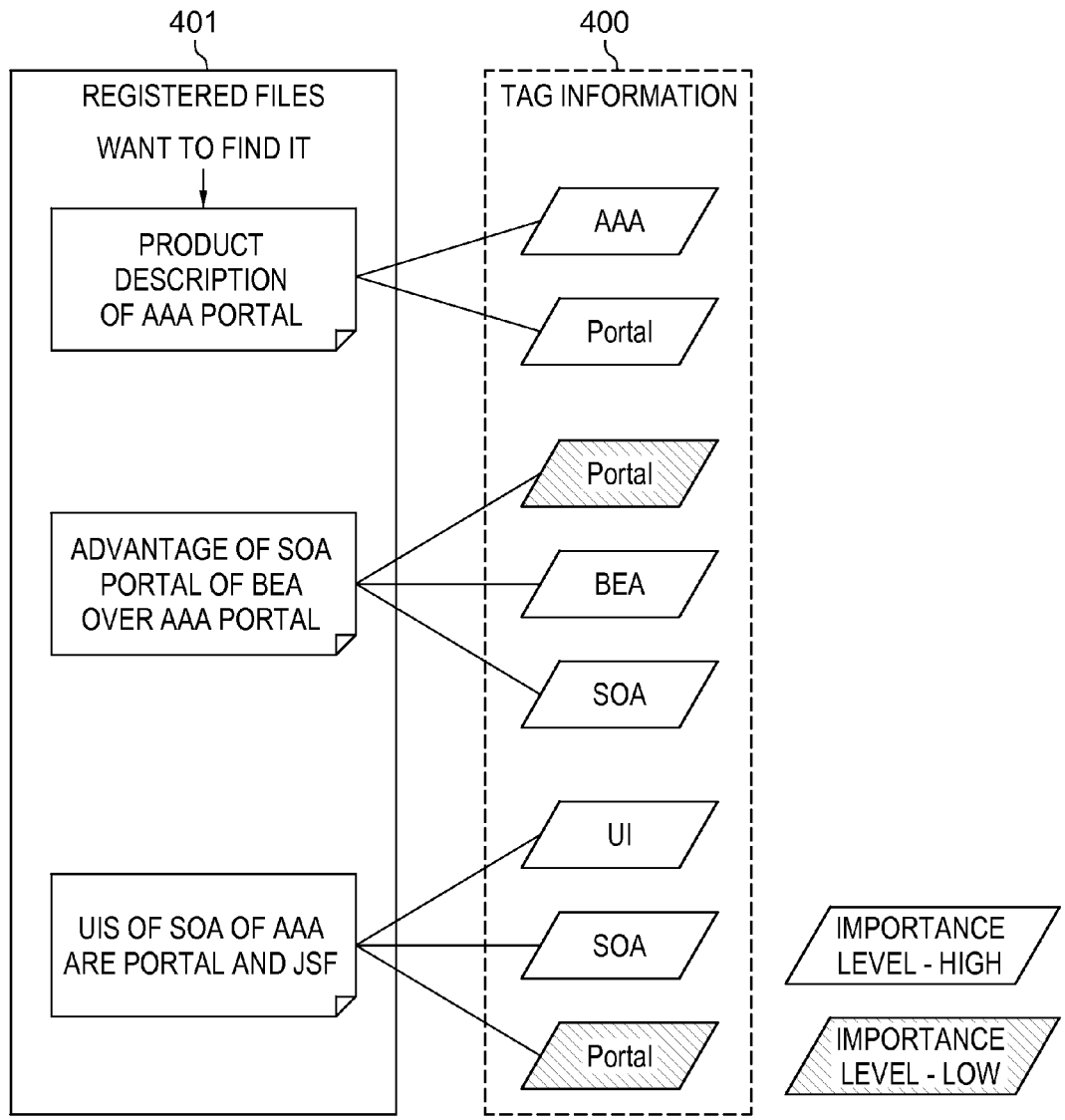
FIG. 4 is a diagram showing a third example of tag information associated with identification information of files.

FIG. 4 shows a third example of tag information 400 associated with identification information of files 401. The registered files are the same as those of the first example shown in FIG. 2. The tag information associated with the identification information of the individual files are the same as those of the second example. In the third example, however, tag information previously registered by the user is distinguished from tag information registered by some other methods. Specifically, tag information "Portal" associated with the first file is registered by the user, while tag information associated with the second and third files are registered by some other methods, e.g., automatically registered by a computer.

If tag information can be distinguished by a registration method therefor, the user can use the registration method in searching for a file. As an example, the management device 30 displays identification information corresponding to tag information registered by the user and identification information corresponding to tag information automatically registered by the management device 30 in a distinguishable manner. If the user thinks the user-registered tag information important 420, 425, the user views only pieces of identification information corresponding to the tag information and search the pieces of identification information for a desired file. In the example of FIG. 4, the first file is found as the search result. If the first file cannot be found, then the user has only to view identification information corresponding to the tag information automatically registered by the management device 30.

To ensure easier file search, the management device 30 according to the embodiment registers tag information automatically to some extent so as not to fail to register tag information. Further, pieces of identification information are displayed distinguishably by registration methods as in the example of FIG. 4. Specific functions will be described below referring to FIGS. 5 to 15.

Figure 5:
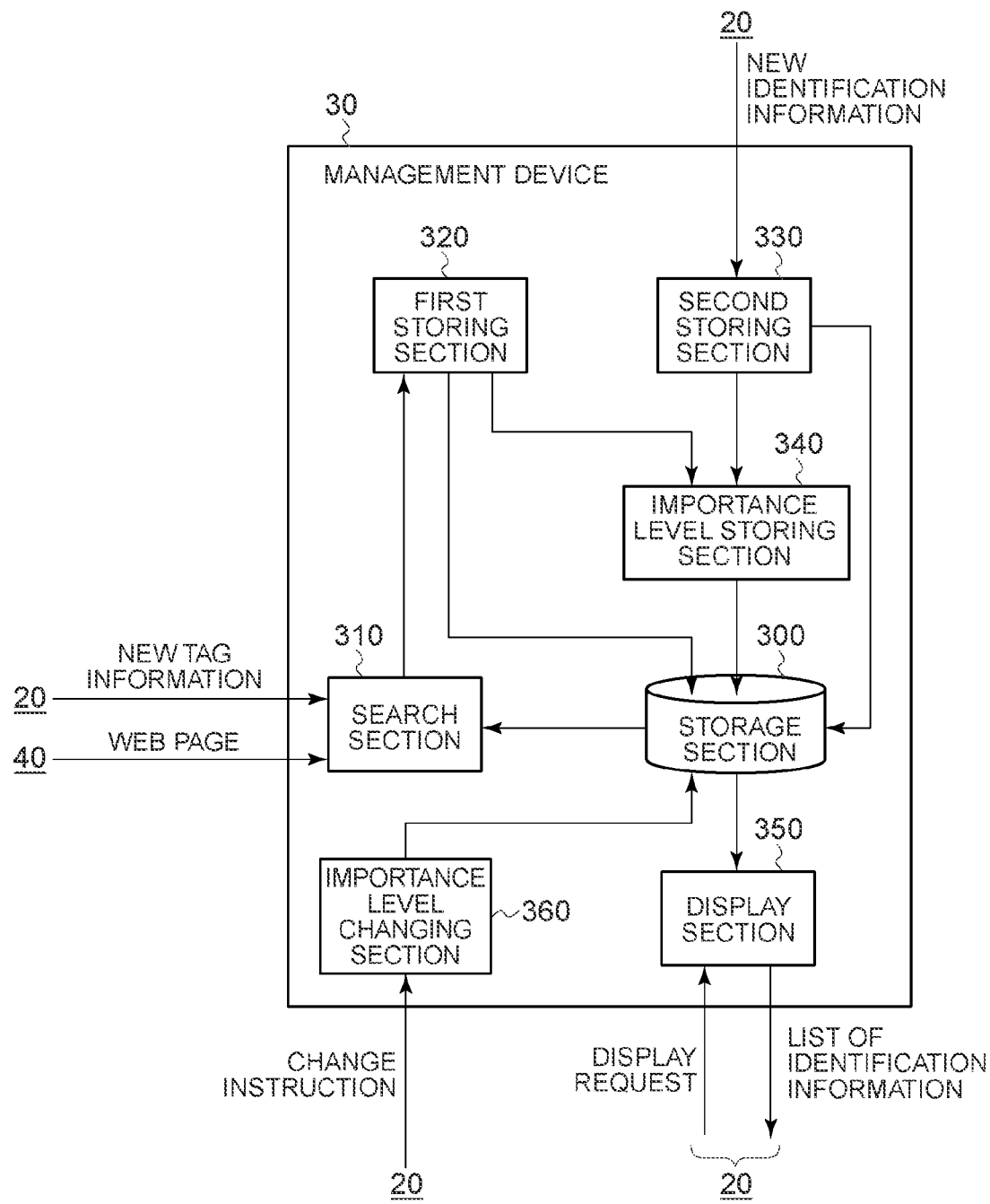
FIG. 5 is a diagram showing a functional configuration of the management device 30.

FIG. 5 shows a functional configuration of the management device 30. With the operations of a CPU 1000, a RAM 1020, etc. to be described later, the management device 30 functions as a storage section 300, a search section 310, a first storing section 320, a second storing section 330, an importance level storing section 340, a display section 350 and an importance level changing section 360. For each of classified files, the storage section 300 stores identification information of the file in association with tag information indicating classification of the contents of the file. When a file is at least a part of a web page, the storage section 300 stores the URL of the web page in association with tag information indicating the classification of the web page. The storage section 300 further stores, for each identification information, an importance level of tag information corresponding to that identification information in association with the tag information.

The search section 310 receives input tag information to be newly registered. For example, the search section 310 receives tag information sent from the terminal device 20 based on the operation of the user. Upon reception of the tag information, the search section 310 searches the classified files for files containing information which matches with the input tag information. For example, the search section 310 receives a character string input as tag information, and searches the web server 40 for web pages containing the input character string. The search target is a web page which is identified by a URL already stored in the storage section 300. For example, the search section 310 may search for a file which is identified by the URL as well as various objects which are embedded and displayed in the web page. In detail, when a web page is described by HTML (Hyper Text Markup Language), the search target is an image file designated by an img tag, another HTML file designated by an iframe tag, or the like. The first storing section 320 stores the input tag information newly associated with the identification information of a searched file in the storage section 300. When information which matches with tag information is searched from a file identified by a URL or from objects embedded and displayed in a page indicated by the file, for example, the first storing section 320 stores the new tag information in association with the URL.

The second storing section 330 receives identification information to be newly registered in the storage section 300 and tag information. The tag information may be selected from tag information already stored in the storage section 300 in association with other identification information, or may be the one to be newly registered. When the tag information is the one to be newly registered, it is also subjected to the process which is executed by the search section 310. In accordance with the new identification information input, the second storing section 330 stores the input identification information in the storage section 300 in association with the input tag information. The importance level storing section 340 stores in the storage section 300 a higher importance level than the importance level of the tag information to be stored by the first storing section 320, in association with tag information to be stored by the second storing section 330.

In response to a display request for identification information designating tag information, the display section 350 reads identification information associated with the designated tag information from the storage section 300, and displays the read identification information in such a way as to be able to identify with which tag information, stored either by the first storing section 320 or by the second storing section 330, the read identification information is associated. The determination on by which storing section the tag information corresponding to each piece of identification information has been stored is executed based on the importance level stored in association with each piece of tag information. For example, the display section 350 reads identification information associated with the designated tag information, together with the importance level corresponding to the identification information and the tag information, from the storage section 300. Then, the display section 350 displays corresponding identification information having a higher importance level with preference over corresponding identification information having a lower importance level.

The importance level changing section 360 changes the importance level already stored in the storage section 300 according to an instruction made by the user. An example of the change will be described referring to FIGS. 6 and 7.

Figure 6:
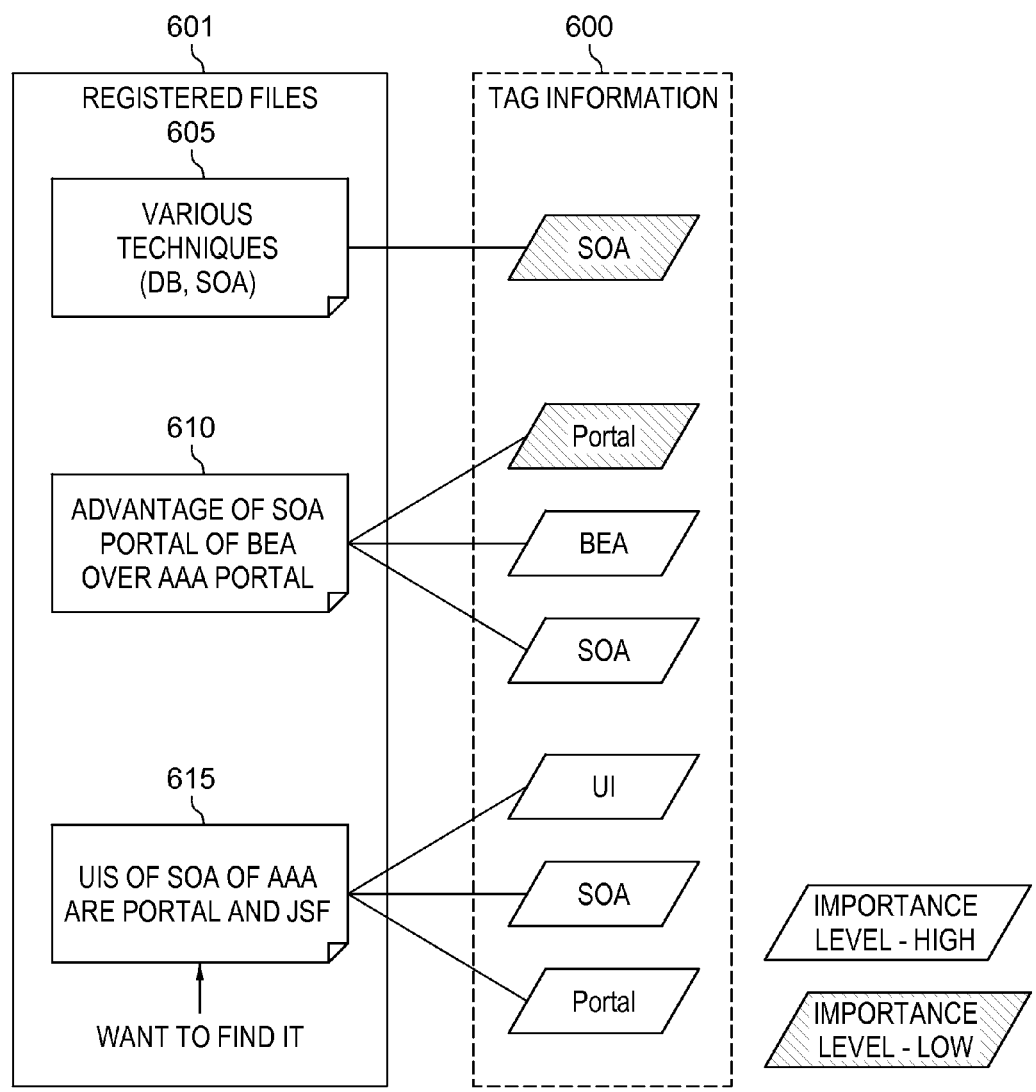
FIG. 6 is a diagram showing a fourth example of tag information associated with identification information of files.

FIG. 6 shows a fourth example of tag information 600 associated with identification information of files 601. The storage section 300 has identification information of three files registered already. A first file 605 contains a text describing various technologies transversely, and contains character strings such as "DB" and "SOA". A second file 610 contains a character string "advantage of SOA Portal of BEA over AAA Portal". A third file 615 contains a character string "UIs of SOA of AAA are Portal and JSF".

The storage section 300 stores the character string "SOA" as tag information in association with the identification information of the first file. As the tag information "SOA" is associated with the identification information by the first storing section 320, a lower importance level is associated with the tag information as compared with other tag information. The tag information "Portal", the tag information "BEA" and the tag information "SOA" are associated with the identification information of the second file. As the tag information "Portal" is associated with the identification information by the first storing section 320, a lower importance level is likewise associated with the tag information as compared with other tag information. The tag information "UI", the tag information "SOA" and the tag information "Portal" are associated with the identification information of the third file.

Figure 7:
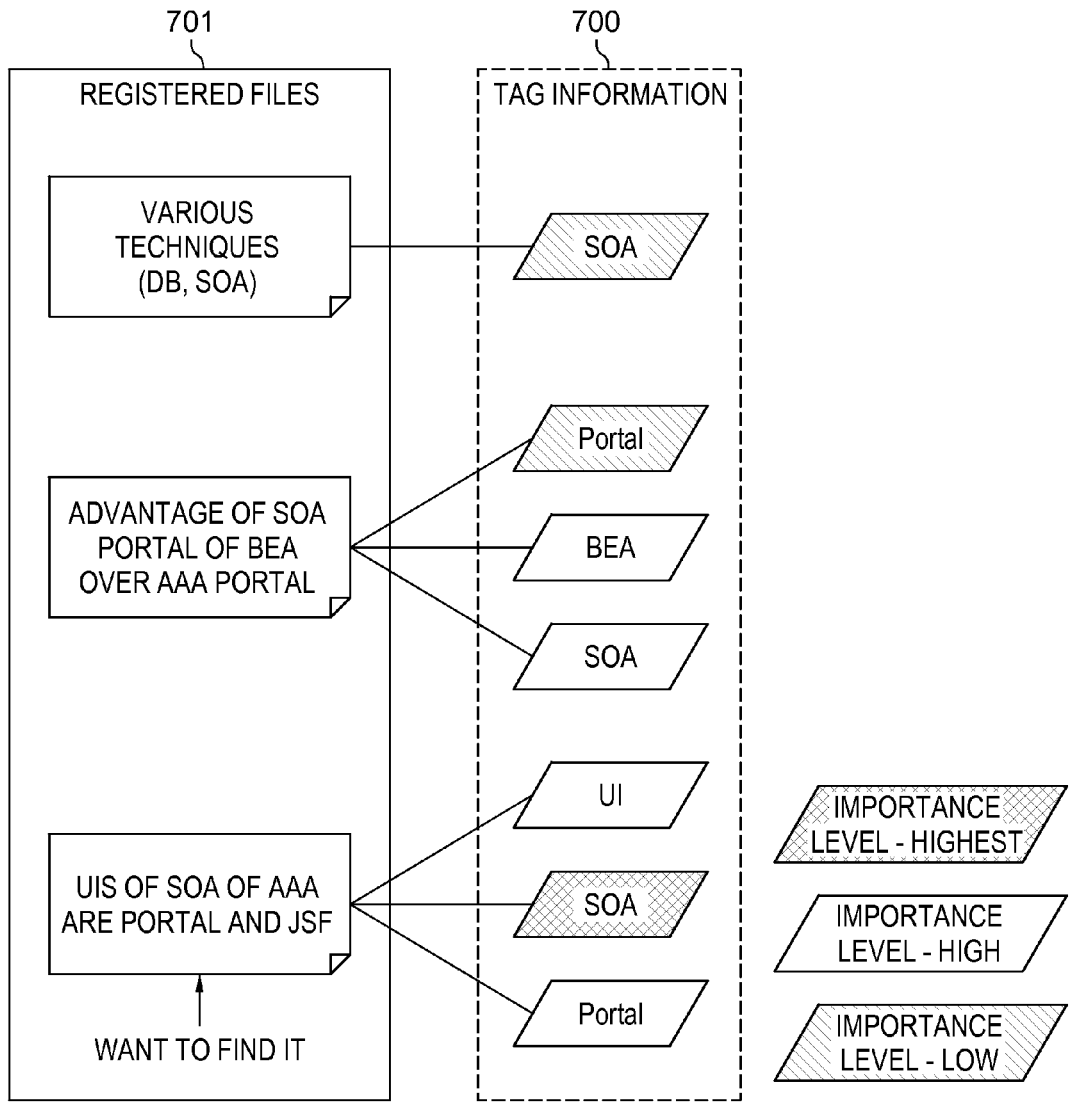
FIG. 7 is a diagram showing a fifth example of tag information associated with identification information of files.

In the example of FIG. 6, the tag information "SOA" is associated with the identification information of both of the second file and third file by the second storing section 330. In this example, the number of files associated with SOA is two, but if more files are associated with SOA, it may become difficult to find a desired file. It is insufficient in this case if tag information is displayed in such a way as to be able to identify by which one of the first storing section 320 and the second storing section 330 the tag information is associated with the identification information. To cope with the situation, the importance level changing section 360 changes the importance level of tag information already stored, making it easier to find a desired file. FIG. 7 shows an example of the case.

FIG. 7 shows a fifth example of tag information 700 associated with identification information of files 701. The first to third files are the same as those of the example of FIG. 6. The tag information corresponding to identification information of the individual files are the same as those of the example of FIG. 6. In the example of FIG. 7, however, the importance level corresponding to the tag information "SOA" of the third file is changed higher 730 than the importance levels corresponding to other tag information by the importance level changing section 360. Changing the importance level in this way can prevent the overflow of wasteful tag information and can ensure control of the display of identification information of files according to the intention of the user as compared with a case where special tag information indicating a high importance level is used.

Figure 8:
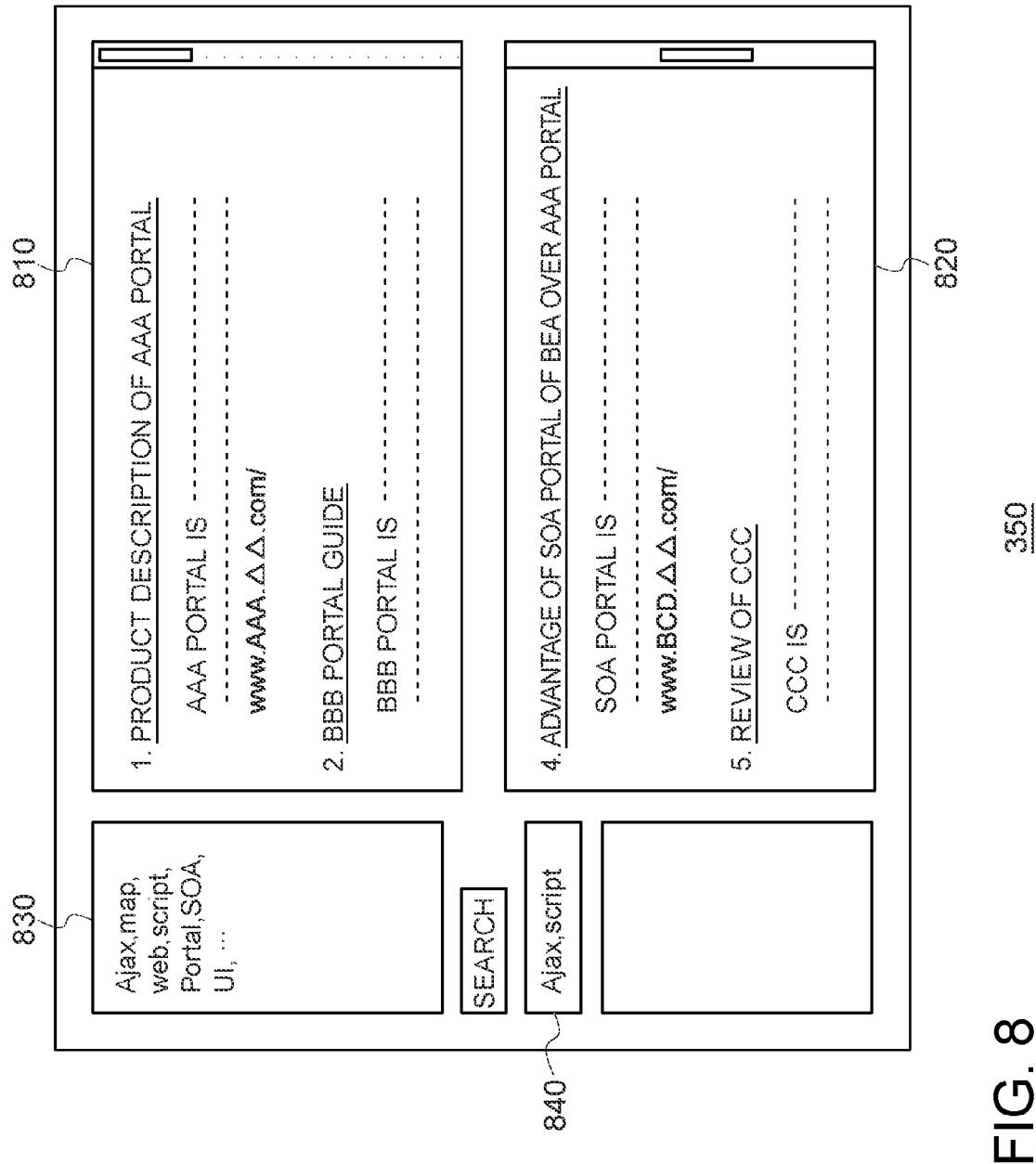
FIG. 8 is a diagram showing a specific example of a screen which is displayed on the terminal device 20 by the display section 350.

FIG. 8 shows a specific example of a screen which is displayed on the terminal device 20 by the display section 350. The display section 350 displays a first selection window 810, a second selection window 820, a tag information window 830 and a tag input window 840. The display section 350 displays on the tag information window 830 a list of pieces of tag information already registered and stored in the storage section 300. The display section 350 receives a display request for identification information designating tag information on the tag input window 840. In response to the display request, the display section 350 reads identification information corresponding to the tag information from the storage section 300. Then, the display section 350 displays identification information associated with the tag information by the second storing section 330 on the first selection window 810. The display section 350 displays identification information associated with the tag information by the first storing section 320 on the second selection window 820.

In this manner, the display section 350 may display identification information on different windows according to by which one of the second storing section 330 and the first storing section 320 the tag information is associated with the identification information. Preferably, the display section 350 displays identification information associated with the tag information by the second storing section 330 preferentially so that the identification information is easily selected. For example, this preferential display may be realized by displaying the first selection window 810 at an upper portion of the screen where the first selection window 810 is more noticeable than the second selection window 820. Alternatively, the first selection window 810 may be displayed larger than the second selection window 820, or characters in the first selection window 810 may be displayed larger than characters in the second selection window 820, or only the first selection window 810 may be displayed while the second selection window 820 is not displayed until the display section 350 accepts a some additional operation.

Identification information to be displayed is, for example, a title of a web page, a URL of a web page, or the like. Specifically, the title is a character string "Product Description of AAA Portal", which is the contents of a TITLE tag of an HTML file or the like constituting the web page. The URL is a character string "www.AAAΔΔΔ.com/". The identification information of a file indicating a web page or the like may be information such as a URL for the information system 10 to identify the file in its internal process, or a character string such as a title for the user to identify the file on the screen.

Depending on the type of a file, identification information may be a file name of the file or a path name indicating the location of the file. When a file is a still image or a moving image, identification information may be its thumbnail image or the like. An underline given to a character string indicating a title in FIG. 8 indicates that the character string is hyperlinked. The display section 350 may have such a hyperlink set therein. In addition, the display section 350 may further display at least a part of data in a file, such as an abstract text of a web page in association with identification information.

Figure 9:
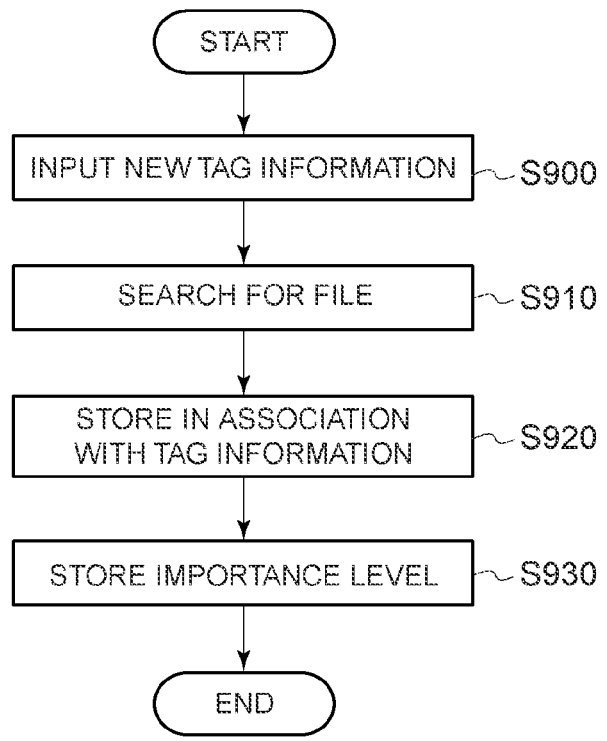
FIG. 9 is a flowchart illustrating a flow of a process which the management device 30 executes according to input new tag information.

FIG. 9 illustrates a flow of a process which the management device 30 executes according to input new tag information. The search section 310 receives input tag information to be newly registered (S900). In response to the input, the search section 310 searches for files containing information matching with the input tag information from those files which are identified by identification information already stored in the storage section 300 (S910). When the tag information is a character string, for example, the search section 310 may search for files containing the character string. The search is not only a case where the character string is completely matched, but also can be so-called fuzzy search such as a case where difference between upper-case and lower-case is ignored or a case where difference between presence and absence of a hyphen is ignored. The first storing section 320 stores the input tag information in the storage section 300 in association with the identification information of the searched files (S920). The importance level storing section 340 stores a lower importance level than that of tag information stored by the second storing section 330, in association with the stored tag information (S930).

Figure 10:
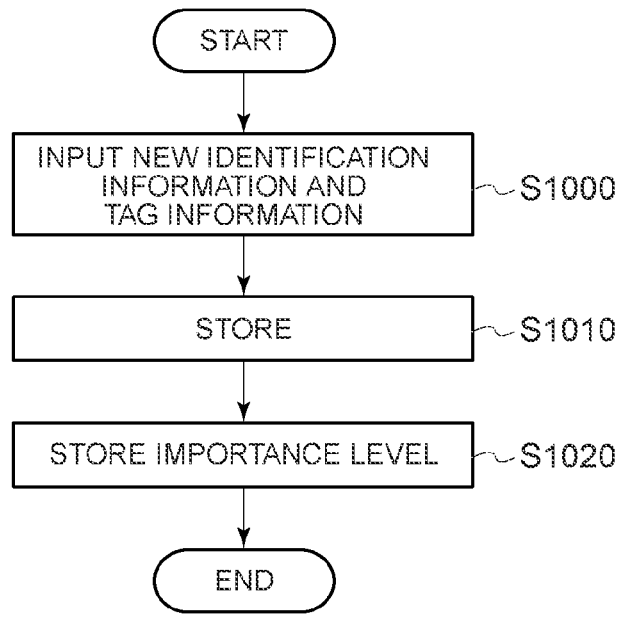
FIG. 10 is a flowchart illustrating a flow of a process which the management device 30 executes according to input new identification information.

FIG. 10 illustrates a flow of a process which the management device 30 executes according to input new identification information. The second storing section 330 receives identification information to be newly registered in the storage section 300, and an input of tag information (S1000). The input of tag information include not only the substance of tag information, e.g., an input of a character string, but also an input for selecting some tag information from registered tag information. That is, the user may select desired tag information from the registered tag information and input the selection result to the management device 30. When the management device 30 receives inputs of tag information from a plurality of users, the second storing section 330 may further input user information to identify a user who makes an input.

The second storing section 330 stores the input identification information in the storage section 300 in association with the input tag information (S1010). When the user information is input, the second storing section 330 may further store the user information indicating which user has input the tag information in association with the tag information. Then, the importance level storing section 340 stores in the storage section 300 a higher importance level than that of the tag information stored by the first storing section 320 in association with the stored tag information (S1020).

FIG. 11 illustrates a flow of a process which the management device 30 executes according to a display request input. The display section 350 receives a display request for identification information designating tag information (S1100). When the management device 30 receives display requests from a plurality of users, the display section 350 may further receive user information indicating which user has made the display request in association with the display request. Then, the display section 350 reads identification information associated with the designated tag information from the storage section 300 (S1110). When the identification information is stored in the storage section 300 in association with the user information, the display section 350 may read only the identification information associated with the same user information as the received user information from the storage section 300.

Next, the display section 350 selects identification information which was associated with the designated tag information by the second storing section 330 from the read identification information, and determines a display order (S1120). This tag information is called "manual tag" for simplicity. When two or more pieces of tag information are associated with a single piece of identification information, the display order is determined based on plural pieces of tag information associated with each piece of identification information. For example, the display section 350 may display those pieces of identification information in descending order of their sum of importance levels associated with all pieces of tag information.

Next, the display section 350 determines the display order for those pieces of identification information with which the designated tag information is associated by the first storing section 320 (S1130). This tag information is called "automatic tag" for simplicity. For example, the display section 350 first calculates, for each piece of identification information whose tag information is stored by the first storing unit, an index value indicating a degree of approximation of a combination of other corresponding tags to a combination of other tag information corresponding to the preferentially displayed identification information. Then, the display section 350 determines the display order for those pieces of identification information in such a way that they are displayed in descending order of their calculated index values. Then, the display section 350 instructs the terminal device 20 to display individual pieces of identification information on the screen of the terminal device 20 based on the determined display order (S1140).

An example of determining, respectively for the identification information associated with automatic tags and the identification information associated with manual tags, the display orders independently has been described above with reference to FIG. 11. Instead, the management device 30 may uniformly determine the display order for identification information associated with either automatic tags or manual tags. Specifically, first, when receiving a display request designating at least a single piece of tag information, the display section 350 selects identification information associated with any of the tag information designated. Then, the display section 350 displays the identification information in descending order of their sum of importance levels corresponding to those pieces of tag information designated. Given that two pieces of tag information (tag information A and B) are designated, for example, the display section 350 sums up the importance levels corresponding to the tag information A and the importance levels corresponding to the tag information B for each piece of identification information. When one identification information 1 is associated with a manual tag A (importance level of 10) and an automatic tag B (importance level of 5), the display section 350 calculates "15" for the identification information 1. When another identification information 2 is associated with an automatic tag A (importance level of 5) and an automatic tag B (importance level of 5), the display section 350 calculates "10" for the identification information 2. In this case, the display section 350 displays the identification information 1 which has a higher sum ("15") of importance levels with preference over the identification information 2 which has a lower sum ("10") of importance levels. In such a case where there is a mixture of manual and automatic tags so that plural pieces of tag information can be designated, the display section 350 may determine the display order for the identification information using "importance level" as a uniform index.

FIG. 12 shows a specific example of plural pieces of tag information 1200 associated with identification information of files. Referring to FIG. 12, one example of how to determine the display order in S1130 will be described. When receiving a display request designating tag information "Ajax", the management device 30 reads identification information corresponding to the tag information. As a result, Google maps, dojotoolkit.org, Ajax-Wikipedia, and Adaptive Path are read out as identification information corresponding to the manual tag "Ajax". Further, Ajaxian, What is Web 2.0, Programmable Web and Town of Ajax, Canada are read out as identification information corresponding to the automatic tag "Ajax". While the titles of web pages are shown in the example for the sake of description, URLs or the like may be read out actually.

There is a case where the tag information Ajax as well as other pieces of tag information is associated with those pieces of identification information. For example, tag information "javascript" and "map" are associated with the identification information "Ajax-Wikipedia". It is to be noted that a combination of the associated tag information differs from one identification information to another. Because tag information is associated with identification information manually or based on the result of searching done by the management device 30, the combination of tag information often properly indicates the contents of the corresponding web page to some extent. Accordingly, the display section 350 determines identification information having a combination of associated tag information which is approximate to that of identification information stored by the second storing section 330, as identification information to be displayed with higher preference. A specific calculation method in the example of FIG. 12 will be described below.

First, the display section 350 calculates an information gain for each of other pieces of tag information (i.e., javascript, map, web) corresponding to any piece of identification information with which the tag information "Ajax" is associated by the second storing section 330. The following is a calculation formula for the information gain.

$$\text{Information Gain (IG)} = H(Y) - H(Y|X)$$

where Y is a variable indicating by which one of the first storing section 320 and the second storing section 330 the designated tag information (e.g., Ajax) is associated and X indicates whether another tag information is associated. H(Y) is defined as follows.

$$H(Y) = -\Sigma p(y)\log_2 p(y)$$

For example, H(Y) is calculated as follows.

$$\begin{aligned} H(Y) &= -p(y = \text{manual tag}) \times \log_2 p(y = \text{manual tag}) - \\ &\quad p(y = \text{automatic tag}) \times \log_2(y = \text{automatic tag}) \\ &= -(4/8) \times \log_2(4/8) - (4/8) \times \log_2(4/8) \\ &= 1.000 \end{aligned}$$

For the tag information "map", H(Y|X) is calculated as follows.

$$\begin{aligned} H(Y \mid X) &= p(x = \text{corresponding to map}) \times \\ &\quad H(Y \mid x = \text{corresponding to map}) + \\ &\quad p(x = \text{not corresponding to map}) \times \\ &\quad H(Y \mid x = \text{not corresponding to map}) \\ &= (5/8) \times \{-(3/5) \times \log_2(3/5) - (2/5) \times \log_2(2/5)\} + \\ &\quad (3/8) \times \{-(2/3) \times \log_2(2/3) - (1/3) \times \log_2(1/3)\} \\ &= 0.951 \end{aligned}$$

Therefore, the information gain becomes IG=0.049 (1.000–0.951). This information gain takes a large value when the tag is more associated with identification information associated by the second storing section 330, and is less associated with identification information associated by the first storing section 320.

The display section 350 performs the aforementioned calculations for each tag information. For the tag information "javascript", for example, the information gain becomes 0.549. For the tag information "web", the information gain becomes 0. Then, for each piece of identification information whose designated tag information (Ajax herein) is an automatic tag, the display section 350 sums up the information gains of other tags corresponding to the identification information. The display section 350 then determines the display order in such a way that identification information with a larger sum of the information gains is displayed with higher preference. This process can ensure accurate selection of an automatic tag having a combination of corresponding tag information which is approximate to that of a manual tag.

FIG. 13 shows features of various process examples. As shown in FIG. 13A, even if a file to be selected contains a keyword featuring the contents thereof, there are a case (case 1) where the keyword is associated as tag information by the user, and a case (case 2) where the keyword is not associated as tag information. FIG. 13B shows advantages and disadvantages in various process examples by symbols in each of the cases. In a case where tag information is associated with identification information only by the second storing section 330 (abbreviated as "manual"), it is easy to search for identification information when a valid keyword is associated as tag information (○), but it is difficult to search for identification information when a valid keyword is not associated as tag information (x). It is to be noted that because tag information is registered by the user him/herself, it is often easy to find desired tag information from the list of tag information (○). However, because the tag information is registered only manually, the user is likely to forget to add tag information, and hence exhaustivity of registration of tag information is low (x).

On the other hand, there may be a process of extracting a character string contained in the contents of a file to be identified by identification information at the time of registering the identification information and automatically associating the character string with the identification information in order to automatically register tag information to some extent (first example). If many pieces of identification information containing the same character string are registered, however, even with the character string designated as tag information, it is difficult to search for desired identification information (Δ). Further, the number of pieces of tag information becomes huge, thus making it difficult to search for tag information from the list of tag information (x). While tag information is exhaustively registered, new tag information is not associated with already registered identification information if it is added after the identification information is registered, thus resulting in a low exhausitivity of registration (Δ).

As another process of registering tag information automatically to some extent, there is a process of searching files corresponding to identification information using pre-registered tag information and automatically associating tags hit in the search with the identification information at the time of registering the identification information (second example). However, as in the first example, many pieces of identification information may be associated with the same tag information, making it difficult to search for desired identification information (Δ). It is to be noted that because pieces of tag information to be registered are limited, it is relatively easy to search for desired tag information from the registered tag information (○). Because new tag information is not associated with registered identification information, the exhausitivity of registration of tag information is not high (Δ).

By way of contrast, because the management device 30 displays manual tags and automatic tags distinguishably, and displays identification information corresponding to a manual tag preferentially even in the case 1, the identification information is not likely to be buried in other identification information corresponding to automatic tags (○). Even in the case 2, tag information is automatically registered, so that desired identification information can be found out without manually registering tag information (○). Because tag information is only what is designated by the user, the list of tag information does not becomes unnecessarily long and desired tag information is easy to find (○). Tag information is exhaustively associated with registered identification information (○). From various viewpoints of consideration, the management device 30 according to the embodiment can easily search for identification information.

Figure 14:
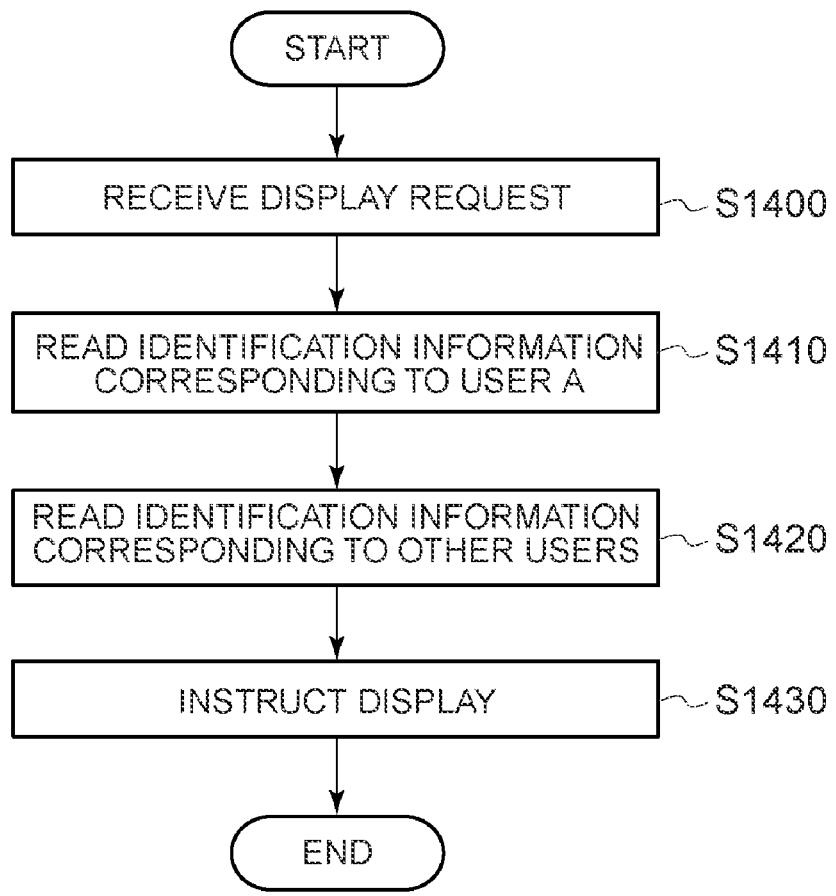
FIG. 14 is a flowchart illustrating a flow of a process of the management device 30 according to the first modification of the embodiment.

Referring now to FIGS. 14 and 15, an example where pieces of tag information are displayed distinguishing which tag information is registered by which user by using the property of the management device 30 accepting registration of identification information from a plurality of users will be described as a first modification.

FIG. 14 illustrates a flow of a process of the management device 30 according to the first modification of the embodiment. The display section 350 receives a display request for identification information designating tag information (S1400). When the management device 30 receives display requests from a plurality of users, the display section 350 further receives user information indicating which user has made each display request, in association with that display request. Then, the display section 350 reads the designated tag information and identification information associated with the received user identification information (identification information for user A) (S1410).

One example of the process will be illustrated with reference to FIG. 15. FIG. 15 shows one example of a data structure 1500 in the storage section 300 according to the first modification of the embodiment. Plural sets of user information and tag information are stored in the storage section 300 in association with identification information. For example, a set of user A and tag information "XXX", a set of user B and tag information "YYY", and a set of user A and tag information "ZZZ" are associated with identification information "www.ΔΔΔ.com". Regarding identification information "www.□□□.com", while a set of user B and tag information "XXX" is associated therewith, a set of user A and tag information "XXX" is not. Even if tag information "XXX" is designated, therefore, the display section 350 reads identification information "www.ΔΔΔ.com", but does not read identification information "www.□□□.com".

Returning to FIG. 14, the display section 350 then reads user identification information of other users than user A, and identification information corresponding to the designated tag information in such a manner as to be distinguishable from the identification information already read in S1410 (S1420). In the example of FIG. 15, identification information "www.□□□.com" is read. Then, the display section 350 displays the read pieces of identification information in such a manner that it is possible to distinguish with which tag information input by which user each read identification information is associated (S1430). For example, the display section 350 may display identification information associated by user A who has requested the display with preference over identification information associated by other users. In the example of FIG. 15, identification information "www.Δ-ΔΔ.com" is displayed with preference over identification information "www.□□□.com".

As has been described above with reference to FIGS. 14 and 15, the first modification can exhaustively displays identification information of various files by displaying the identification information based on tag information associated therewith by a plurality of users. Further, displaying identification information distinguishing by which user it is associated can make it easier to search for desired identification information.

Figure 16:
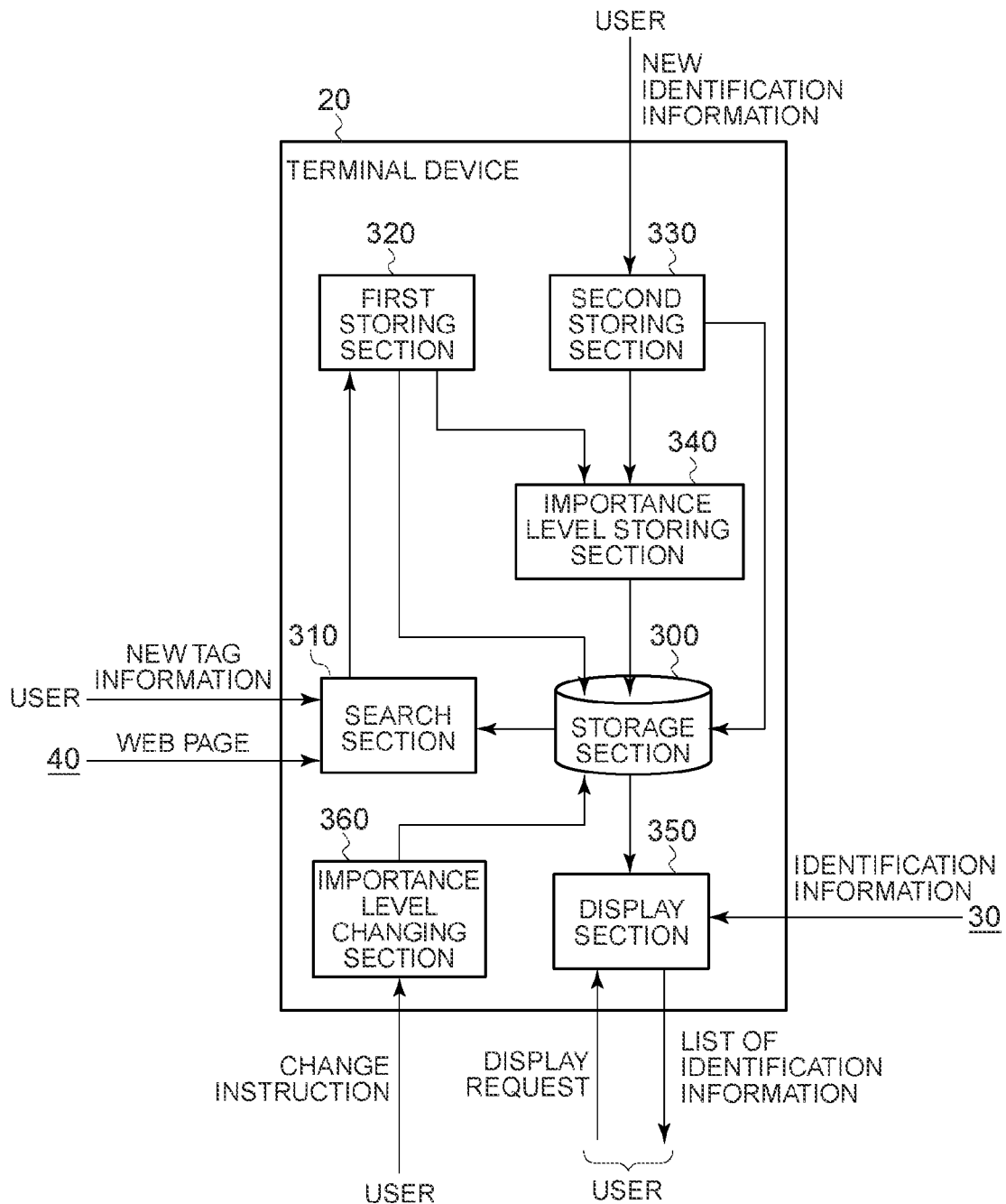
FIG. 16 a diagram showing the functional structure of the terminal device 20 according to the second modification of the embodiment.

Referring now to FIG. 16, an example where the terminal device 20, not the management device 30, is provided with the various functions explained above with reference to FIGS. 1 to 13 will be explained as a second modification.

FIG. 16 shows a functional configuration of the terminal device 20 according to the second modification of the embodiment. In the second modification, like the management device 30, the terminal device 20 has a storage section 300, a search section 310, a first storing section 320, a second storing section 330, an importance level storing section 340, a display section 350 and an importance level changing section 360. Because those components are approximately identical in function to the corresponding components of the embodiment given with the same reference symbols, only differences will be described below. The search section 310 receives tag information to be newly registered in response to a key operation or the like performed by a user. The display section 350 receives a display request for identification information designating tag information in response to a key operation or the like performed by the user.

In the second modification, when receiving the display request for identification information designating tag information, the display section 350 may read identification information corresponding to the tag information from the storage section 300 of the external management device 30 as well as the storage section 300 of the terminal device 20. For example, identification information stored in the storage section 300 of the management device 30 is registered by a user different from the user of the terminal device 20. The display section 350 displays the identification information read from the storage section 300 of the management device 30 in such a manner as to be distinguishable from identification information read from the storage section 300 of the terminal device 20. Thus, the configuration of the second modification can also display identification information distinguishably according to by which user the identification information is associated, thus assisting the user's information retrieval.

Figure 17:
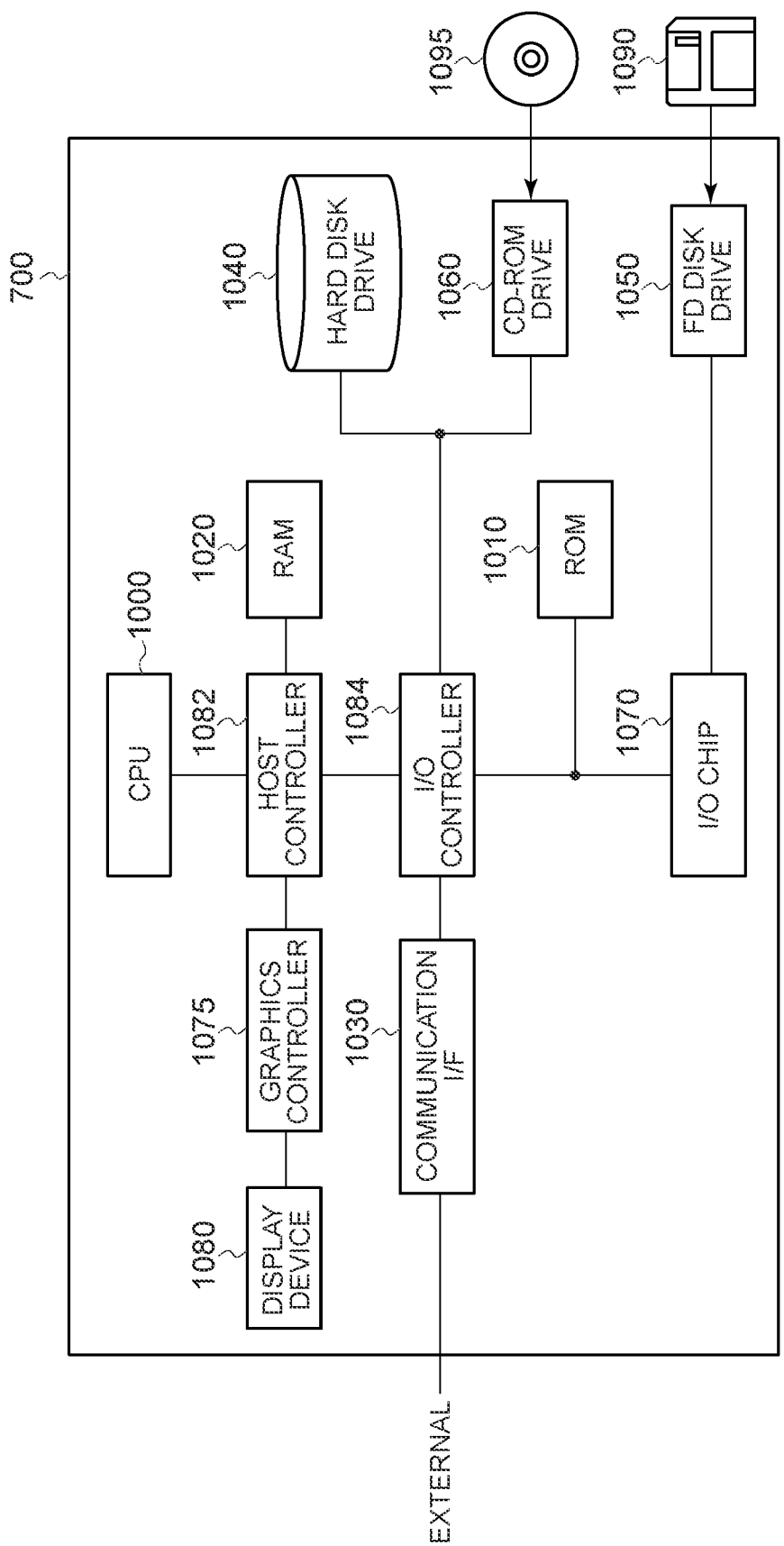
FIG. 17 a diagram showing one example of a hardware configuration of a computer 700 which serves as the terminal device 20 or the management device 30.

FIG. 17 shows one example of a hardware configuration of a computer 700 which serves as the terminal device 20 or the management device 30. The computer 700 includes a CPU-related section, an input/output section, and a legacy input/output section. The CPU-related section has a CPU 1000, a RAM 1020 and a graphics controller 1075, which are mutually connected by a host controller 1082. The input/output section has a communication interface 1030, a hard disk drive 1040 and a CD-ROM drive 1060, which are connected to the host controller 1082 by an input/output controller 1084. The legacy input/output section has a ROM 1010, a flexible disk drive 1050 and an input/output chip 1070, which are connected to the input/output controller 1084.

The host controller 1082 connects the RAM 1020 to the CPU 1000 and the graphics controller 1075, which access the RAM 1020 at a high transfer rate. The CPU 1000 operates to control the individual sections based on programs stored in the ROM 1010 and the RAM 1020. The graphics controller 1075, which is coupled to a display device 1080, acquires image data which is generated by the CPU 1000 or the like on a frame buffer provided in the RAM 1020. Instead, the graphics controller 1075 may include a frame buffer inside to store image data generated by the CPU 1000 or the like.

The input/output controller 1084 connects the host controller 1082 to the communication interface 1030, the hard disk drive 1040 and the CD-ROM drive 1060, which are relatively fast input/output devices. The communication interface 1030 communicates with an external device over a network. The hard disk drive 1040 stores programs and data which the computer 700 uses. The CD-ROM drive 1060 reads a program or data from a CD-ROM 1095, and provides it to the RAM 1020 or the hard disk drive 1040.

The input/output controller 1084 is connected with relatively slow input/output devices, such as the flexible disk drive 1050 and the input/output chip 1070. The ROM 1010 stores a boot program which is executed by the CPU 1000 when the computer 700 is activated, and programs which depend on the hardware of the computer 700. The flexible disk drive 1050 reads a program or data from a flexible disk 1090, and provides it to the RAM 1020 or the hard disk drive 1040 via the input/output chip 1070. The input/output chip 1070 connects a flexible disk 1090 and various kinds of input/output devices via, for example, a parallel port, a serial port, a keyboard port, a mouse port and so forth.

The program to be supplied to the computer 700 is stored in a recording medium, such as the flexible disk 1090, the CD-ROM 1095 or an IC card, and provided by a user. The program is read from the recording medium via the input/output chip 1070 and/or the input/output controller 1084, installed on the computer 700 and executed. Because the operations which the program causes the computer 700 or the like to execute are the same as the operations of the terminal device 20 or the management device 30 which have been explained with reference to FIGS. 1 to 16, their descriptions will be omitted.

The program described above may be stored in an external storage medium. An optical recording medium, such as DVD or PD, a magnetooptical recording medium, such as MD, a tape medium, a semiconductor memory, such as an IC card, and the like can be used as storage media in addition to the flexible disk 1090 and the CD-ROM 1095. A storage device, such as a hard disk or RAM, provided at a server system connected to a private communication network or the Internet can be used as a recording medium to provide the computer 700 with the program over the network.

While the embodiment of the present invention has been described above, the technical scope of the invention is not limited to the scope of the above-described embodiment. It should be apparent to those skilled in the art that various changes and improvements can be made to the embodiment. For example, a single computer system may serve as both the management device 30 and the web server 40. In this case, the computer system displays identification information of files stored in the computer system on the screen of the terminal device 20. The system that provides files, such as images or music pieces, may display a list of pieces of identification information of files to make it easier for the user to select the files provided by the user himself or herself. It is apparent from the description of the appended claims that such changed or improved embodiments are encompassed in the technical scope of the invention.

What is claimed is:

1. A system comprising a memory device, and further comprising:
   a storage section that stores identification information of each of classified files in association with tag information indicating classification of contents of that file;
   a search section that, in response to inputting via a user interface of tag information to be registered, searches the classified files for a file including information matching with the input tag information by distinguishing between tag information registered by different methods;
   a first storing section that stores the input tag information in the storage section in association with identification information of the searched file; and
   a display section that, in response to a display request for identification information designating tag information, reads identification information associated with the designated tag information from the storage section, and displays the read identification information.

2. The system according to claim 1, further comprising a second storing section that, in response to inputting of identification information to be registered in the storage section and tag information, stores the input identification information in the storage section in association with the input tag information,
   wherein in response to the display request for identification information designating tag information, the display section reads identification information corresponding to the designated tag information from the storage section, and displays the read identification information in such a way as to distinguish between tag information registered by different methods.

3. The system according to claim 1, wherein
   the file is at least a part of a web page,
   the storage section stores a URL (Uniform Resource Locator) of a web page in association with tag information indicating classification of the web page,
   the search section receives a character string as tag information, and searches for a web page including the input character string among web pages identified by URLs already stored in the storage section,
   the first storing section stores the input tag information in the storage section in association with a URL of the searched web page, and
   in response to the display request for a URL designating tag information, the display section reads a URL corresponding to the designated tag information from the storage section, and displays the read URL.

4. The system according to claim 2, wherein
   the storage section further stores, for each identification information, an importance level of tag information corresponding to that identification information in association with the tag information, and
   the system further comprises:
   an importance level storing section that stores, in the storage section, tag information to be stored by the second storing section in association with an importance level higher than that of tag information stored by the first storing section; and
   an importance level changing section that changes an importance level already stored in the storage section according to an instruction given by a user, and
   in response to the display request for identification information designating tag information, the display section displays identification information having a higher importance level associated with the designated tag information from the storage section, and indicates priority over displayed identification information having a lower importance level associated with the tag information.

5. The system according to claim 4, wherein
   the storage section stores a single piece of identification information in association with two or more pieces of tag information, and
   in response to the display request for identification information designating tag information, the display section displays pieces of identification information corresponding to the designated tag information in descending order of their sum of importance levels associated with all corresponding pieces of tag information.

6. The system according to claim 4, wherein
   the storage section stores a single piece of identification information in association with two or more pieces of tag information, and
   in response to the display request for identification information designating tag information, the display section displays identification information whose designated tag information is stored by the second storing section, with preference over other identification information, and
   for each piece of identification information whose tag information is stored by the first storing unit, the display section calculates an index value indicating a degree of approximation of a combination of other corresponding tag information to a combination of other tag information corresponding to the identification information displayed preferentially, and displays pieces of identification information in descending order of their index values calculated.

7. The system according to claim 2, wherein the second storing section receives identification information and tag information from each of a plurality of users, and stores the input identification information in the storage section in association with the input tag information and user information indicating which user has input the identification information, and in response to the display request for a file designating tag information, the display section reads identification information and user information associated with the designated tag information from the storage section, and displays, based on the read user information, the read identification information and user information in such a way as to be able to identify with which tag information input by which user each piece of identification information read is associated.

8. The system according to claim 2, wherein in response to the display request for a file designating tag information, the display section reads, from an external device, identification information with which the designated tag information is associated by another user, and displays the read identification information in such a way as to be discriminatable from identification information in the storage section which is associated with the designated tag information.

9. A method comprising:

in response to inputting via a user interface of tag information to be registered, searching contents of classified files for a file including information matching with the input tag information by distinguishing between tag information registered by different methods;

storing the input tag information in a storage section of a computer in association with identification information of the searched file; and in response to a display request for identification information designating tag information, reading identification information associated with the designated tag information from the storage section, and displaying the read identification information.

10. A computer program product comprising:

a storage medium; and a program stored on the storage medium, where, if executed by a processor, the program causes a computer to implement:

a storage section that stores identification information of each of classified files in association with tag information indicating classification of contents of that file;

a search section that, in response to inputting via a user interface of tag information to be registered, searches the classified files for a file including information matching with the input tag information by distinguishing between tag information registered by different methods;

a first storing section that stores the input tag information in the storage section in association with identification information of the searched file; and a display section that, in response to a display request for identification information designating tag information, reads identification information associated with the designated tag information from the storage section, and displays the read identification information.

* * * * *